Jan. 22, 1946.  C. D. KNOWLTON  2,393,383
BOX MAKING
Filed Sept. 10, 1941  10 Sheets-Sheet 4
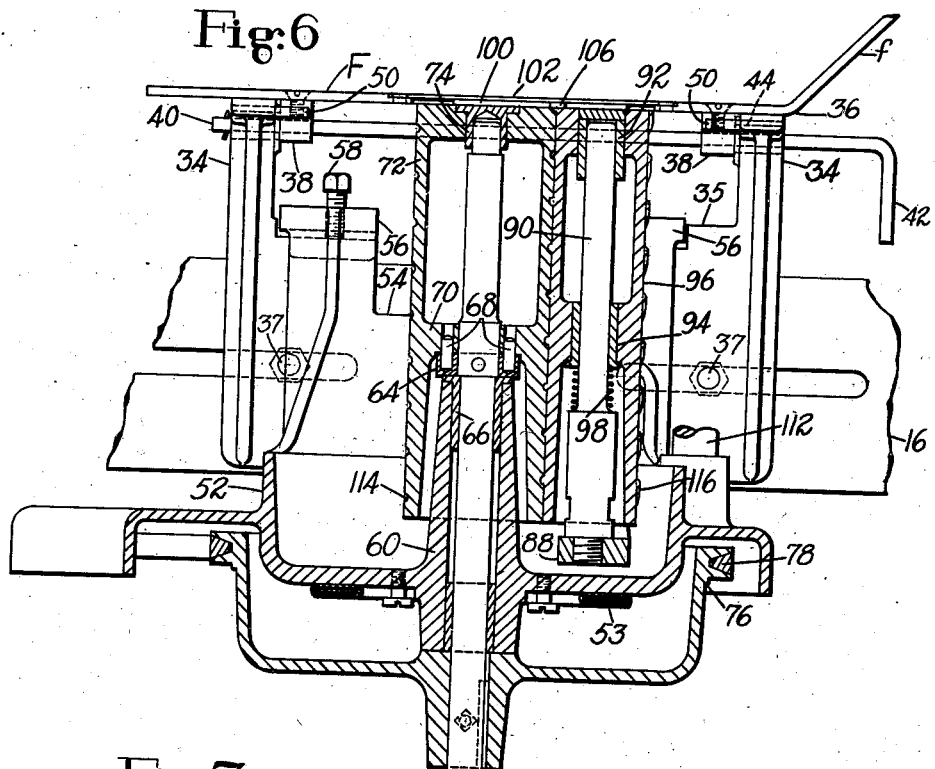
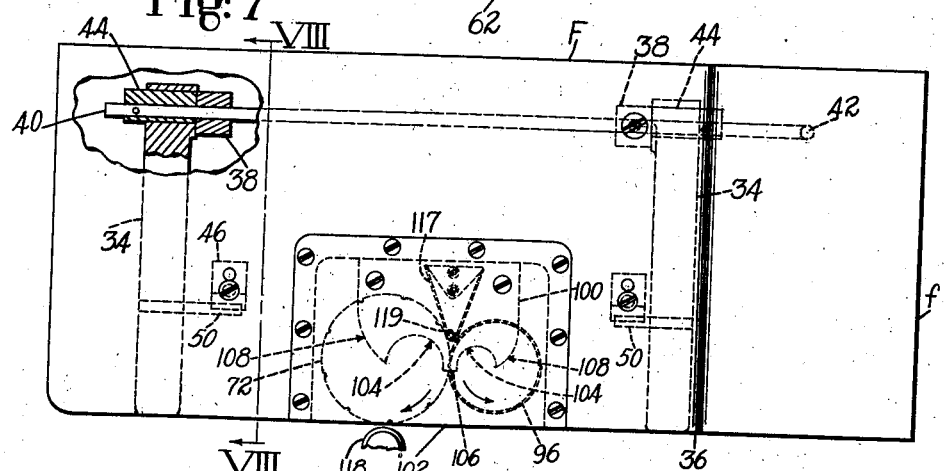
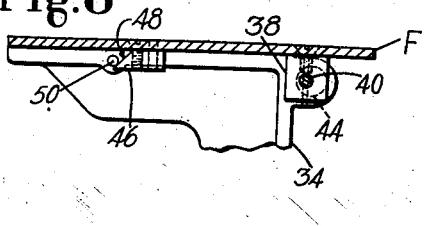
INVENTOR Jan. 22, 1946.  C. D. KNOWLTON  2,393,383
BOX MAKING
Filed Sept. 10, 1941  10 Sheets-Sheet 5

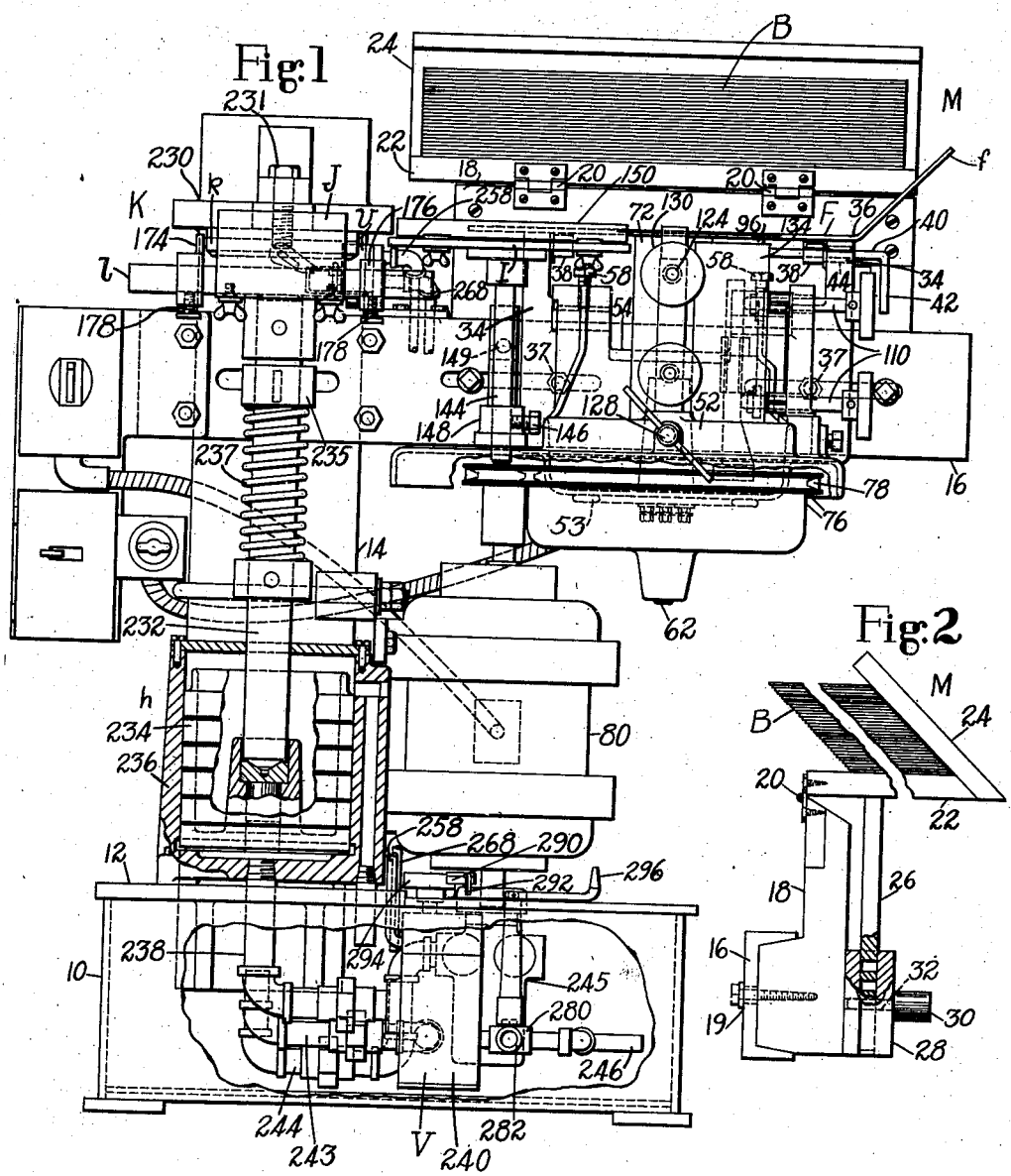

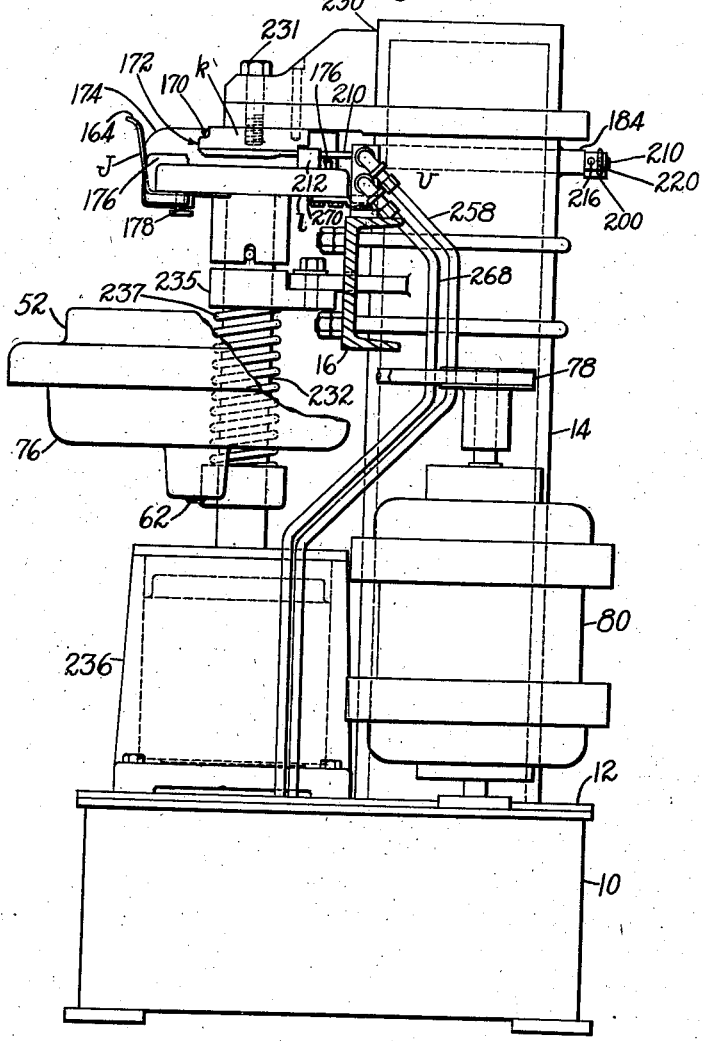

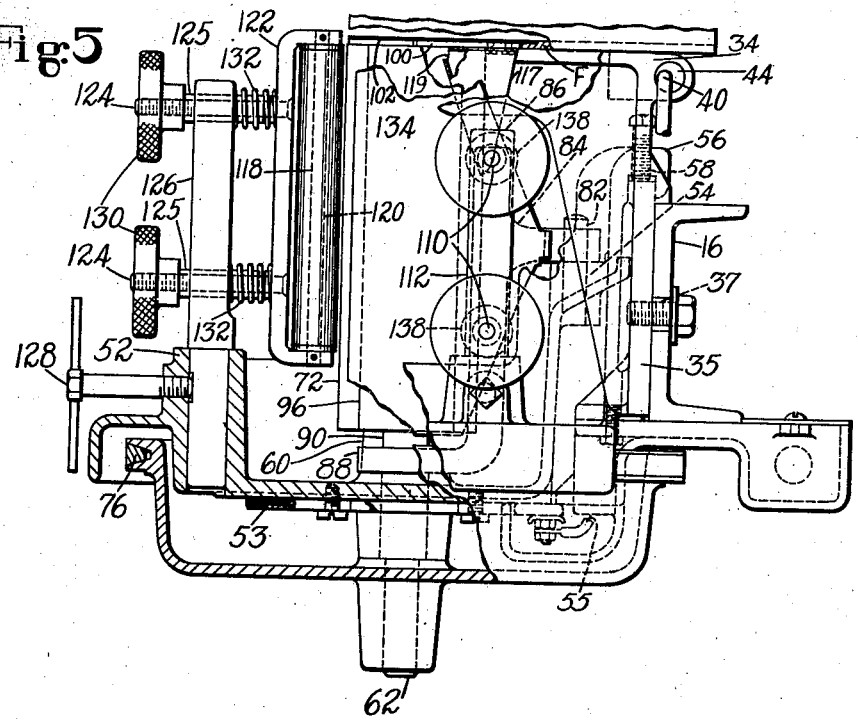
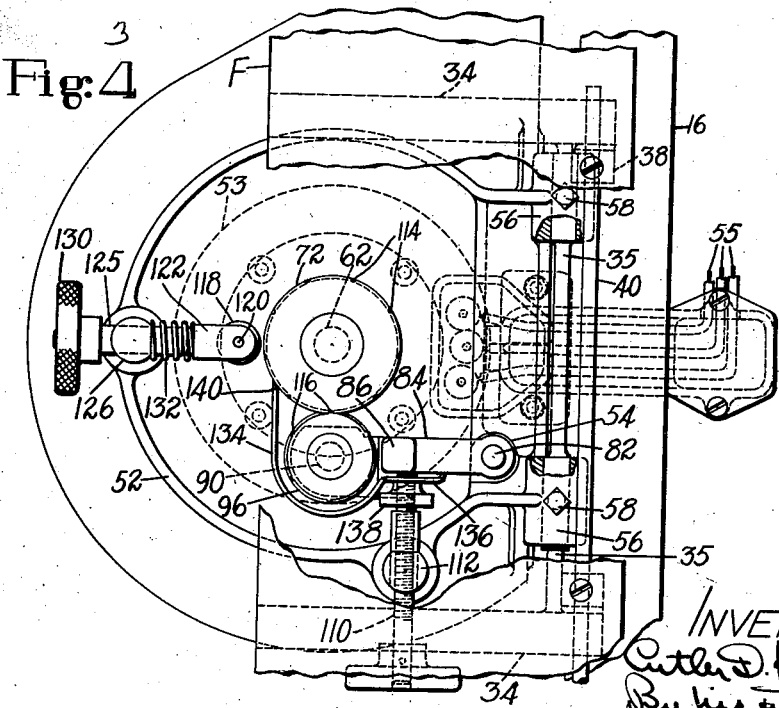

INVENTOR
Cutler D. Knowlton
By his Attorney

Jan. 22, 1946.  C. D. KNOWLTON  2,393,383
BOX MAKING
Filed Sept. 10, 1941  10 Sheets-Sheet 6
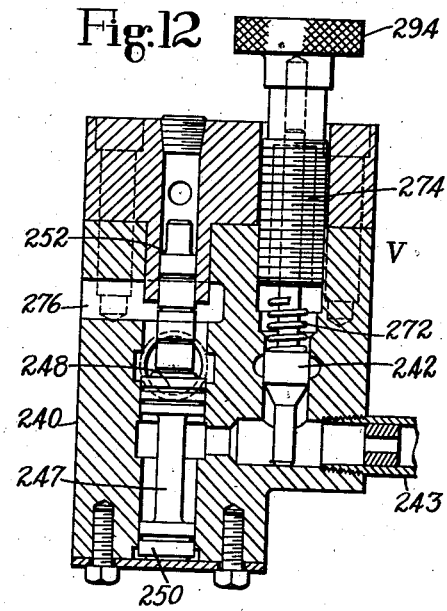
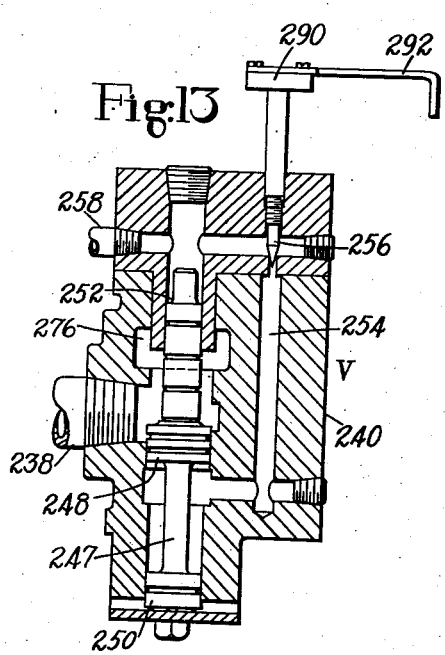
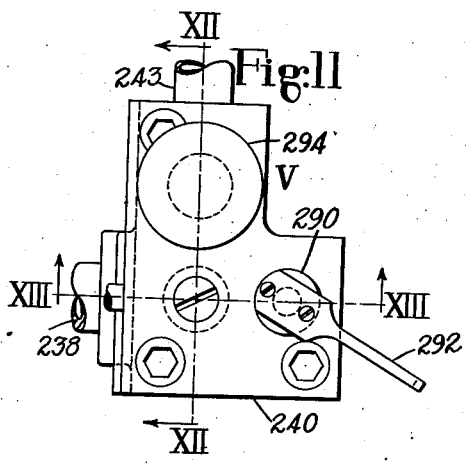

Jan. 22, 1946.　　C. D. KNOWLTON　　2,393,383
BOX MAKING
Filed Sept. 10, 1941　　10 Sheets-Sheet 7
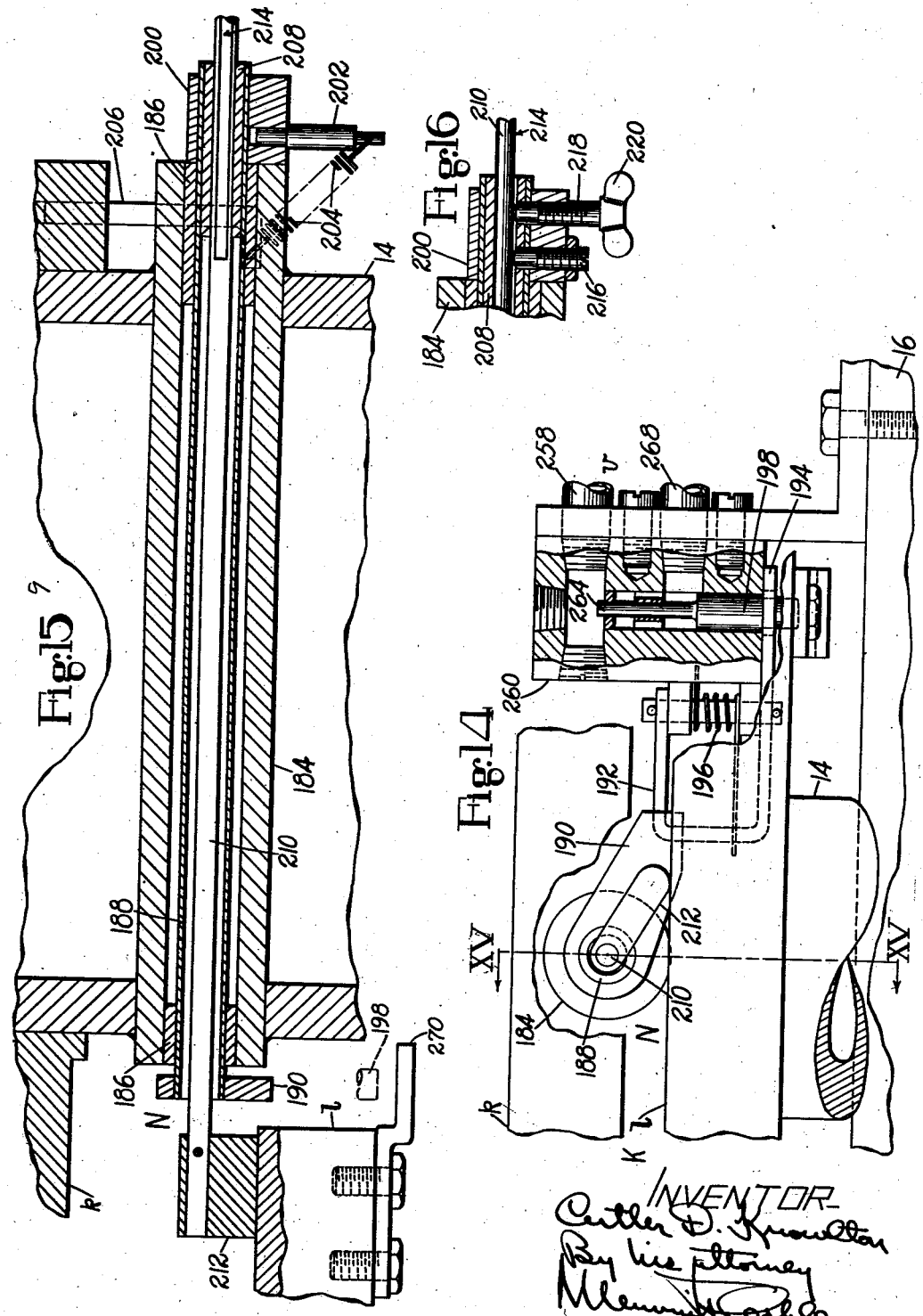

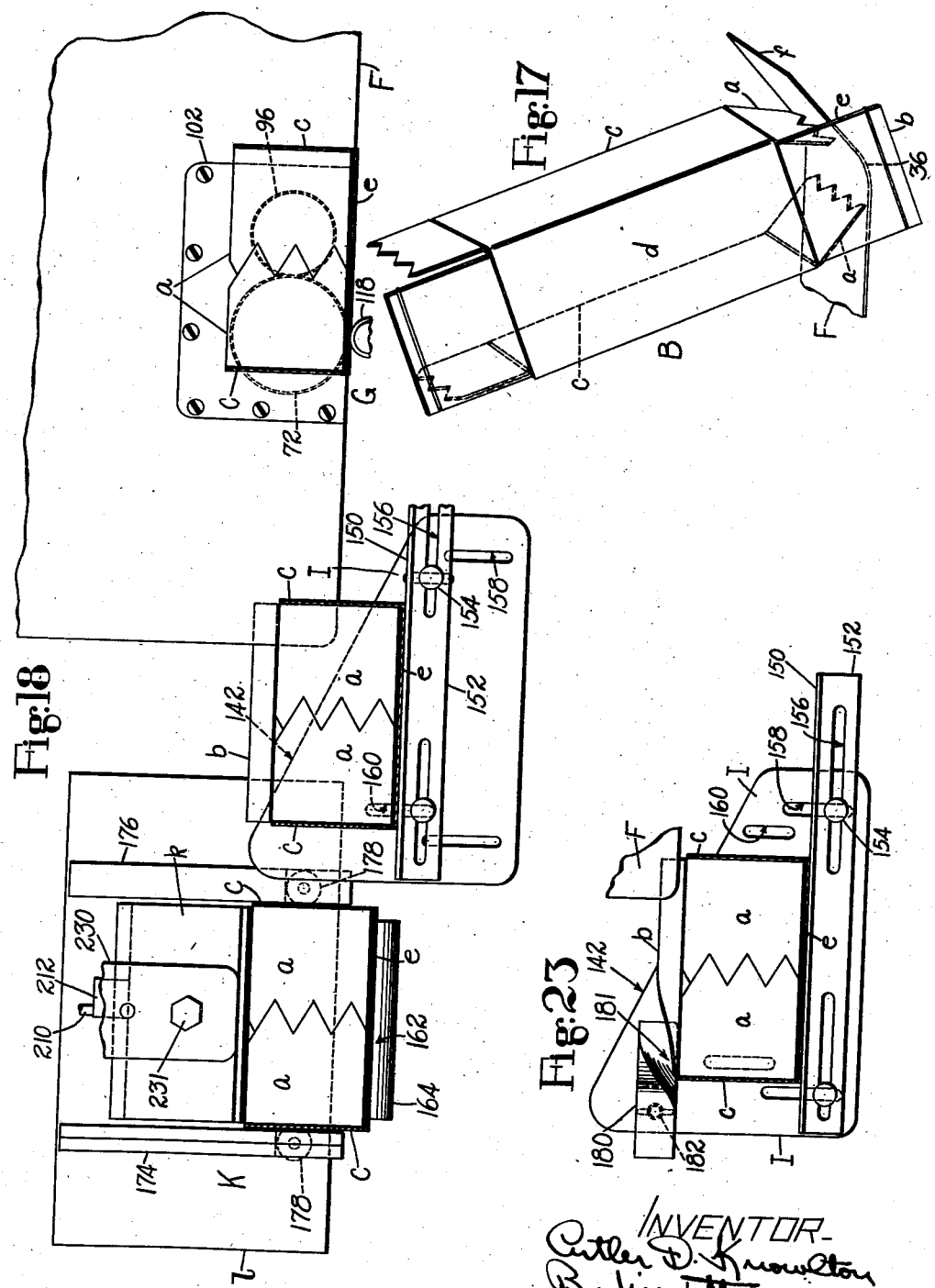

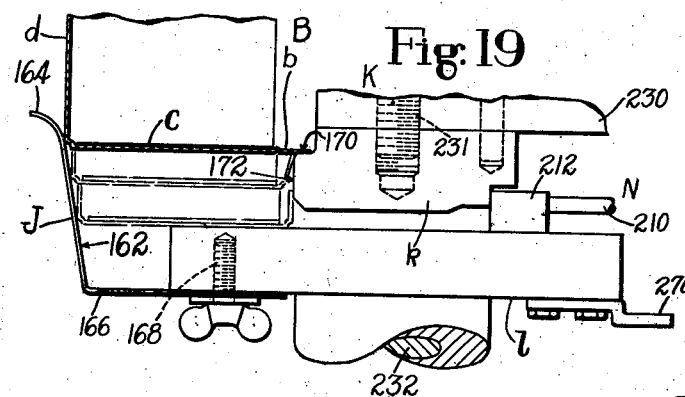
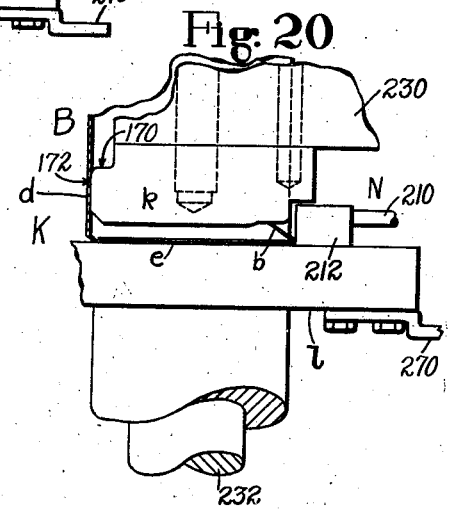
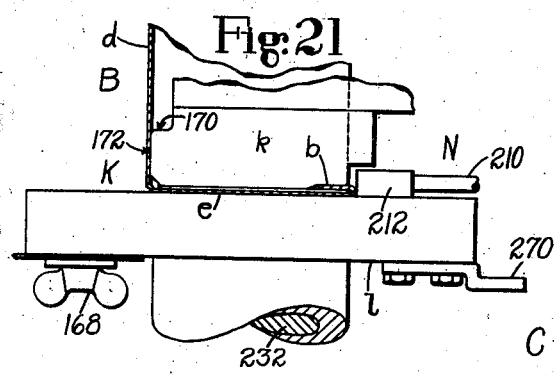
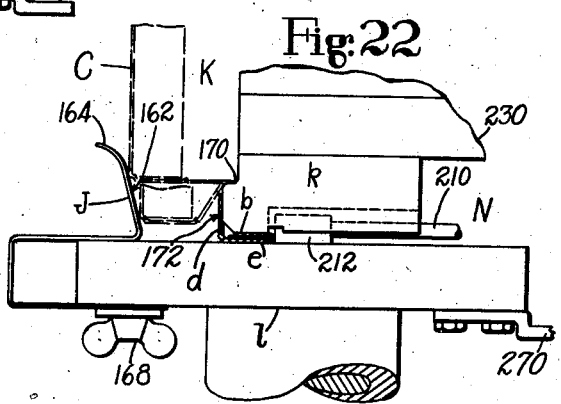

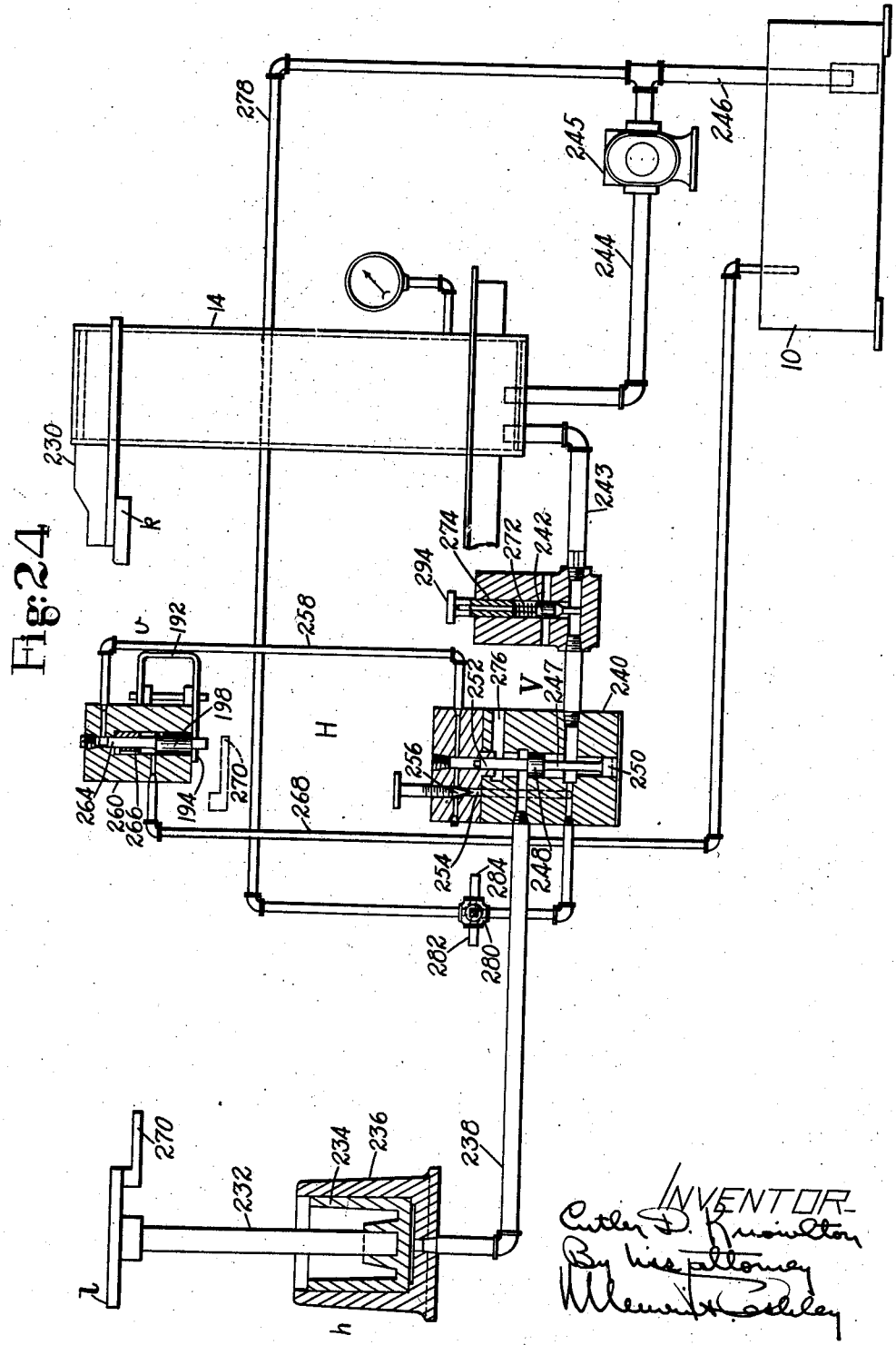

Patented Jan. 22, 1946

2,393,383

UNITED STATES PATENT OFFICE 2,393,383

BOXMAKING

Cutler D. Knowlton, Rockport, Mass., assignor to Hoague-Sprague Corporation, Lynn, Mass., a corporation of Massachusetts Application September 10, 1941, Serial No. 410,274

68 Claims. (Cl. 93—49)

This invention relates to the forming and pressing of such articles as boxes, it being especially applicable to the setting up of box-blanks of the type in which the end-formation consists of opposite corner-laps, an end-wing and an infolded extension from said end-wing. It may, however, have utility in other connections.

The invention has as an object the provision of efficient, compact and relatively simple apparatus, with the assistance of which an operator may, by manipulation of a blank, set it up to box-form rapidly with little effort and without causing interference as the blank is advanced during the operations upon it. For the attainment of this object, the apparatus has a guide, which may be in the form of a table with a substantially horizontal surface, along which a box-blank may be advanced by the operator with a portion depending below the table. This portion of the blank, as herein disclosed, consists of the end-wing and its extension, the corner-laps moving over the guiding surface. With the guide co-operates blank-treating means, as adhesive-applying mechanism and folding mechanism, which act upon the depending portion of the blank. The folding mechanism is shown as a member having an edge inclined rearwardly of the apparatus and in the direction of advance of the blank, and which engages the depending portion as it is moved outwardly from the guide, the folding member having a substantially horizontal surface against which said portion rests and is retained, after it has been folded by the inclined edge. From the folding member, the operator introduces the advancing partially folded blank, still vertical, by downward and inward movement into pressure mechanism. A surface or surfaces of the pressure mechanism may receive contact of a portion of the blank, as the end-wing-extension, to fold this, after which relative movement between the pressure members in a vertical direction completes the end-formation. This has been effected wholly by manipulation, as the blank is advanced along a path consisting of travel through the various mechanisms, combined with outward, downward and inward movements. The relative vertical movement is preferably produced by hydraulic mechanism, or like fluid-pressure means, having a vertically positioned cylinder and piston controlled by means actuated by the blank. Throughout the apparatus the various blank-treating mechanisms are free from complication, there being no feeding or conveying mechanisms, and there is no necessity for synchronizing the action of the mechanisms with one another. The blank, in its vertical position, may be grasped readily and given its preliminary folding by the operator, and with elongated blanks, such as are used for the formation of boxes to contain pairs of shoes, and for the setting up of which this apparatus is particularly adapted, the placing of the major dimension of the blank vertically enables the operator to stand close to the guide and the operating mechanisms. Here he can present and advance the blank to the best advantage, without danger of the outer extremity striking his body and interfering with manipulation. Because the adhesive-applying mechanism is beneath the table, the depth of the apparatus, from front to rear, is minimized. To produce the end-setting pressure, fluid-pressure mechanism is best employed because of its simplicity, durability and ease of control, and to such mechanism the arrangement of the present apparatus specially lends itself, because the operating or motor elements, such as the cylinder and piston, may be vertically positioned to effect the relative vertical movement of the pressure members, and when thus related will be subject to little leakage.

As to the devices and mechanisms which are combined in the apparatus, the plate which folds the depending blank-portion is arranged to act effectively upon it and to maintain temporarily the folded portion in place during the advance of the blank, it further being variable in its relation to the associated elements. With it is combined means independently variable in position for limiting outward movement of the blank. An adjustable guide associated with the pressure members directs the blank between said members, in such a manner that surfaces upon one of the members aids in the folding of a blank-portion. In preparation for this folding at the pressing mechanism, a member associated with the folding plate may act to pre-flex the folded portion. Associated with the pressure members are adjustable walls, which limit the advance of the blank from the folding plate, guide it into place for pressing and serve as guards to protect the operator. The fluid mechanism, by which relative movement of the work-pressing members is produced, is controlled in a novel manner by a pilot-valve under the influence of the work and of the pressure mechanism itself, which pilot-valve causes a main valve to both open and close by alteration in the balance of pressure upon it, and thereby initiate and terminate the application of pressure to the end-formation of the blank. This pressure may be held a predetermined time according to the rate of change of pressure upon the main valve, which rate is variable. Provision is made for the renewal of the air-cushion in the fluid-pressure system and for convenient access to all the controlling elements of such system.

There is included in this invention a method of making boxes, in which an operator partially folds an elongated blank, holds it with its major dimension substantially vertical, and shifts such vertical blank along a guide to receive the action of adhesive-applying means and folding means. In this same vertical relation, he may subject it to the action of pressure-applying means to complete the end-formation. In shifting the blank along a guide into engagement with the pressure-applying means, said blank may be further folded by movement outwardly from the guide and then inwardly. As herein disclosed, the blank is of the type having side-wings, corner-laps and end-wings with their extensions. Its side-wings are folded by the operator and its corner-laps by engagement with a substantially horizontal guide; its depending end-wing is coated with an adhesive and folded as it is shifted along the guide and outwardly therefrom by the operator; while the end-wing-extensions are folded by inward movement. The utility of such a method has been hereinbefore developed in connection with my improved apparatus. The gluing mechanism of this case has been made the subject of a divisional application, filed in the United States Patent Office in my name on September 21, 1943 and bearing the Serial No. 503,180.

In the accompanying drawings illustrating one of several possible embodiments of the invention, Fig. 1 shows my improved apparatus in front elevation, with parts broken away;

Fig. 2 is a detail in side elevation of the blank-support;

Fig. 3, a side elevation of the pressure mechanism, looking from the right in Fig. 1, and including certain associated elements;

Fig. 4, a top plan view of the gluing mechanism, the table above it being broken away;

Fig. 5, a broken side elevation of said mechanism, looking from the right in Fig. 1;

Fig. 6, a vertical transverse section of the gluing mechanism;

Fig. 7, a detail plan view illustrating the mounting of the guide-table;

Fig. 8, a sectional detail on the line VIII—VIII of Fig. 7;

Fig. 9, an enlarged detail in perspective of the glue-supplying and -applying rolls;

Fig. 10, a plan of the base of the machine showing the hydraulic connections through which the pressure mechanism is operated;

Fig. 11, a top plan view of the main valve controlling the hydraulic mechanism;

Figs. 12 and 13, vertical sections on the lines XII—XII and XIII—XIII, respectively, of Fig. 11;

Fig. 14, a broken front elevation of the mechanism through which the blank initiates the action of the main valve;

Fig. 15, a section on the line XV—XV of Fig. 14;

Fig. 16, a horizontal sectional detail of the means for adjusting the mechanism of Figs. 14 and 15;

Fig. 17, a fragmentary perspective view illustrating the first step of folding a box-blank;

Fig. 18, a diagrammatic top plan view of the succeeding steps of box-gluing and -folding, up to the action upon the end-wing-extension;

Figs. 19, 20 and 21 illustrate somewhat diagrammatically successive steps in the folding of the end-wing-extension and applying pressure to set the glued end-formation;

Fig. 22 is a view, similar to Figs. 19 to 21, but bringing out the successive extension-folding and end-pressing operations, as applied to a box-cover;

Fig. 23 shows in top plan means for starting the folding of the end-wing-extension in connection with the folding of the end-wing; and Fig. 24 is a diagrammatic representation of hydraulic mechanism by which the pressure upon the work is created.

Figure 10:
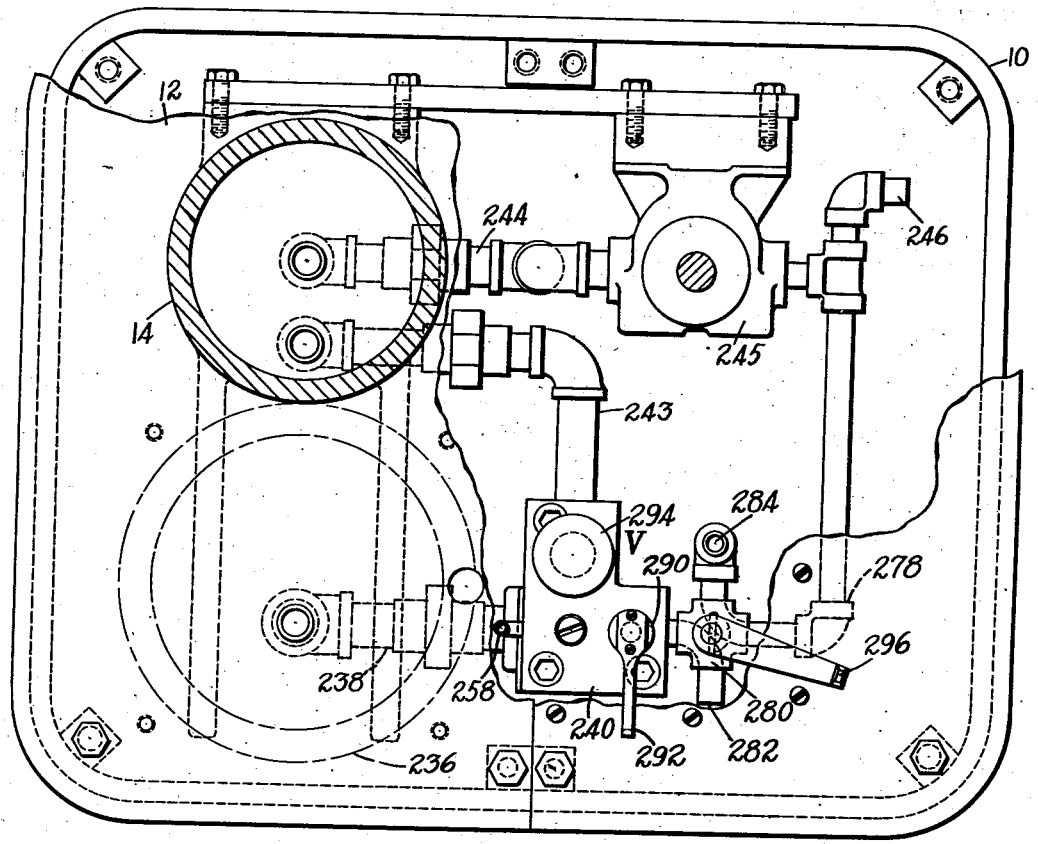

The apparatus enables the operator, with either a box-blank B or a cover-blank C of the well known type having corner-laps $a$ and end-wing-extensions $b$ (Fig. 17) and held in the hands with the side-wings $c$ folded substantially at right angles to the body $d$, to readily turn in the corner-laps at one extremity of the blank by the engagement of their ends with a horizontal guide-table F and its inclined terminal portion $f$. As the blank is advanced with the corner-laps resting upon the table, the inner faces of the end-wing $e$ and its extension projecting downwardly receive the action of gluing mechanism G (Fig. 18). It then passes from the table into engagement with a plate I, which folds the glued surface of the end-wing against the corner-laps and there temporarily retains it in its advance above a downwardly and inwardly inclined guide-wall J, with which the juncture of the body $d$ and the end-wing $e$ contacts. As the blank is now lowered by the operator, this wall carries the edge of the end-wing-extension against the fixed abutment $k$ of pressure mechanism K (Fig. 19), and directs it upon the movable pressure-table $l$ of said mechanism. Over the table $l$, the operator shifts the blank rearwardly into pressure-receiving position (Fig. 20), and, in so doing, contact with the abutment partially folds the end-wing-extension over the corner-laps and, by the engagement of the juncture of these blank elements with controlling mechanism N, releases a pilot-valve $v$ (Fig. 24) to initiate the action of a main valve V. The valve V starts in operation fluid-pressure mechanism H, preferably hydraulic, and including a motor $h$ by which the table $l$ is raised to force for a predetermined time the elements of the end-formation together against the abutment $k$, until the glue is sufficiently set. Generally in the description, it will be assumed that a box-blank B is being operated upon.

The apparatus has a hollow base 10 furnishing a tank having a cover 12. From the cover rises a tubular column 14 (Figs. 1 and 3), closed at the top and having secured across its front near the upper extremity a horizontal bar 16. Fastened to the bar, for adjustment longitudinally thereof by slot-and-screw connections 19, is an upright 18, to which is attached by hinges 20, 20 a support M for the blanks to be set up. By changing the position of the support along the bar, it may be located in the preferred relation to the associated elements, especially the pressure mechanism K, for blanks of different lengths. The support preferably consists of a table 22, upon which a stack of the blanks may rest, and a stack-positioning wall 24 inclined forwardly from the rear of the table. As is shown in Fig. 2, this wall produces a gradual displacement of the stack across the supporting table 22, so each blank is somewhat advanced with respect to that beneath it. As the operator takes the blanks one by one from the top of the stack, this displacement facilitates their grasping. To present the top blank in the most convenient position for the operator to seize, the support M may be variable as to angle. This is shown as effected by allowing the table 22, which is hinged about a horizontal axis, to rest upon a strut 26, adjustable vertically in a guide 28 at the back of the upright 18. The strut appears as fixed in place by a pin 30 extending horizontally through an opening in the guide, and through any one of a plurality of openings 32 in the strut which may receive the pin and lower or raise the support to give it the preferred angle.

In front of the blank-support M to the frame-bar 16 are attached two brackets 34, 34 connected to each other by a web 35 (Figs. 4 and 5). On these brackets, which may be considered as a portion of the frame, rests the table F, with its terminal portion f inclined upwardly from the right-hand end, merging into the table by a curved connecting portion 36. The attachment of the web 35, and therefore of the table F, to the frame is by slot-and-screw connections 37, which permit horizontal adjustment of the table with respect to the pressure mechanism K. As already indicated, the table and its extension aid the operator in partially folding the ends of the blanks, and then properly presenting them for gluing to the mechanism G. To give access to the gluing mechanism, the table F is hinged to the brackets, so it may be turned back, it being releasably latched against displacement in its normal horizontal position. Attached to the table, just at the inner side of each bracket 34, is a block 38 (Figs. 7 and 8) through which passes a rod 40 having at its outer extremity a depending crank-arm 42. Fixed to the rod are two eccentrics 44, rotatable, respectively, in the two brackets 34. Attached to the underside of the table are two latching projections 46, having at their forward ends downwardly inclined surfaces 48. Each of these surfaces engages a pin 50, extending horizontally from one of the brackets to hold the table against accidental upward displacement. When the crank is raised and the eccentrics thereby turned, the table is drawn sufficiently to the rear to remove the latching projections 46 from beneath the pins 50. The table may then be swung back to fully clear the gluing mechanism. With the crank again raised, the table may be restored to its horizontal relation, and, in lowering the crank, the latch-surfaces 48 re-engage the pins to hold the table firmly in operating position.

Figure 9:
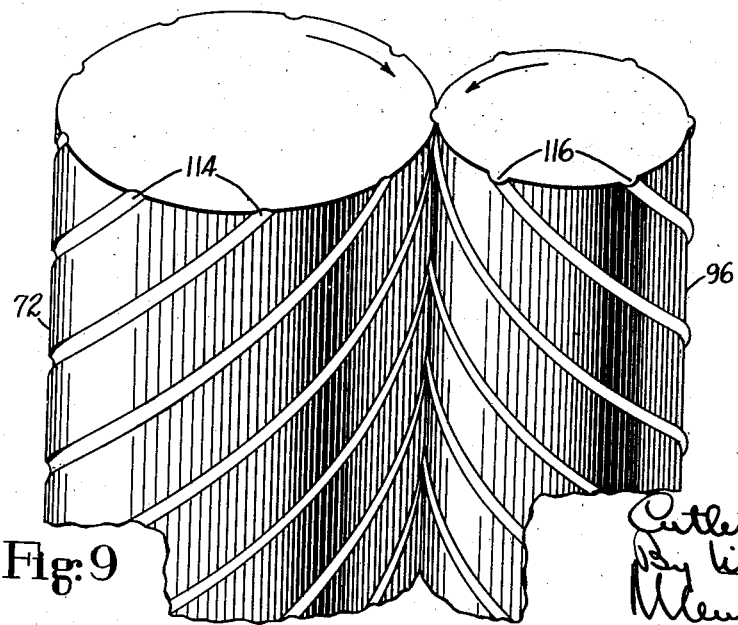

The mechanism G (Figs. 4, 5 and 6) has a pot or container 52 for glue, or other adhesive, which may be warmed by an electrical heating unit 53 attached to the bottom of the pot and supplied through conductors 55. At the rear of the pot is an upward extension 54, which is divided to form arms hooked at 56 over the web 35. Threaded through the tops of the hooks are screws 58, contacting with the edge of the web, and by turning down or backing off these screws the pot may be leveled. From the center of the pot rises a tubular extension 60, in which is journaled a shaft 62 having secured to it a collar 64 stepped on a bushing 66 resting on the top of the extension. Set in the top of the collar are a plurality of vertical pins 68, which are received in openings in a central transverse wall 70 of an applying roll 72. The upper end of the roll is closed and has a bushing 74 fitting the shaft, while the lower portion of said roll surrounds and is spaced from the extension 60 of the pot. The applying roll is rotated in the direction indicated by the arrows in Figs. 7 and 9, constantly during the operation of the apparatus, through a pulley 76 fast upon the lower end of the shaft 62, and receiving power through belt-gearing 78 from a motor 80 mounted upon the column 14.

Pivoted at 82 upon the pot-extension 54 is an arm 84 having a vertical portion 86, from the bottom of which is a horizontal projection 88. Fixed in the projection is a spindle 90 surrounded by upper and lower bushings 92 and 94. A roll 96, for supplying and distributing the adhesive from the pot to the applying roll 72, is rotatable about the bushings and is supported upon an extension-spring 98 interposed between a shoulder upon the spindle and the bushing 94. This spring urges the upper end of the roll against the horizontal lower surface of a scraper 100, attached to the underside of a panel 102 recessed into the table F, the scraper also receiving contact of the end of the roll 72. The manner of mounting the rolls upon the shaft 62 and spindle 90, together with their being freed by the turning back of the guide-table and scraper upon it, permits said rolls to be removed conveniently for cleaning, while their closed tops and depending lower portions so cover the mounting elements that these are protected against access of glue to the bearings. The forward edge of the scraper 100 is cut away to form two depressions 104, 104 above the ends of the two rolls (Fig. 7), leaving a projection 106 extending over the bite of the rolls. From the depressions, the edges of the scraper are curved rearwardly and outwardly at 108 so they diverge. The distributing roll is forced against the applying roll to have a substantially uniform bearing thereon throughout its length by two screws 110, threaded horizontally through a post 112 rising from the side of the pot 52, the inner ends of the screws engaging the arm-portion 86. In the periphery of the applying roll 72 are a plurality of uniformly spaced helical grooves 114 (Fig. 9), with which mesh like projections 116 upon the roll 96. The positive rotation of the applying roll drives the distributing roll, and the helical grooves and projections upon the rolls, together with the intermediate spaces, have the effect of elevating the glue from the pot and spreading it over the periphery of the applying roll, ready for application to the work. Some glue will rise to the upper ends of the rolls to be removed by the scraper, the curved edges 108 of which direct it outwardly to flow down the rear of the rolls and return to the pot. Some of this downward flow will be carried to the bite of the rolls at the rear, to be again elevated. This will be prevented from accumulating at the top and becoming thickened, by a device which diverts it from the rolls and back to the pot. The device is preferably in the form of a generally V-shaped spout 117, fitting between the rolls at their upper extremities and inclined downwardly and rearwardly (Figs. 5 and 7). At its upper end the spout is flanged and attached to the underside of the scraper 100. At the apex of the V, near the top, is an opening 119. Through this opening the gathering glue is forced and, flowing down the spout, is returned to the pot at a point somewhat removed from the rolls. Some of the glue may rise above the opening and reach the tops of the rolls, to work under the narrow portion 106 of the scraper, whence it will be carried to the edges 108 for removal.

As the corner-laps a, a of the blank B are advanced along the table F by the operator, to present the inner faces of the end-wing e and its extension b to the applying roll 72, these faces are held against said applying roll by a pressure-roll 118. This pressure-roll is freely rotatable about an axis parallel to that of the applying roll, turning upon a vertical spindle 120 fixed in a yoke 122. The yoke is supported by two horizontal rods 124, passing through sleeves 125 fixed in a post 126 extending upwardly from the front of the pot 52. The post is secured to the pot for ready removal, to give access to the rolls 72 and 96, by a screw 128. The outer ends of the rods have threaded upon them thumb-nuts 130, and expansion-springs 132 are interposed between the post and the yoke about the sleeves. By rotating the thumb-nuts, the position of the roll 118 and the force with which it holds the blanks against the applying roll may be altered. In the travel of the blank, the end-wing and its extension are guided between the applying roll and pressure-roll, and kept clear of the distributing roll by a shield 134. The shield may be of sheet-metal, curved about the outer side of the distributing roll (Fig. 4) and extending in front of it into proximity to the periphery of the applying roll. From the curved portion, it extends rearwardly at 136, and has two openings through which pass the screws 110 to support it. It is positioned by nuts 138 upon the screws and against which the angular end-portion 136 bears. In addition to directing the work in a proper path, the shield will guard said work against drops and strings of glue thrown outwardly from the rolls, and may further serve at its free end 140 as a scraper for the applying roll 72. This last-named function is attained by so setting the nuts 138, that the shield-edge 140 is held close to the applying roll, any excess of glue being removed by this edge and returned to the pot.

Leaving the gluing mechanism G, and still guided by the table F, the forward edge of the end-wing e of the blank B strikes the inner edge 142 of the folding plate I, which is inclined rearwardly from a point in front of the table in the direction of advance of the work over the table F (Fig. 18). The plate lies in a plane substantially parallel to the surface of the table F and is shown as attached to the upper extremity of a rod 144 (Fig. 1), secured for vertical adjustment by a set-screw 146 in a bracket 148, hooked over the frame-bar 16 and fixed thereto by a set-screw 149. By varying the height of the folding plate, its upper surface may be brought into the proper relation to that of the table, while by changing the position of the bracket along the bar 16, its spacing with respect to the table F and pressure mechanism K may be altered. As already noted, the location of the table is independently adjustable by the slot-and-screw connections 37. Contact with the edge 142 turns up the end-wing (Fig. 18), and just as its rear edge is leaving the table F, said end-wing reaches substantial parallelism with the folded corner-laps a. Its outer face now bears upon the upper surface of the plate I, its coated inner face being brought into preliminary engagement with the outer faces of the corner-laps. As appears in Fig. 23, substantially the entire surface of the end-wing is in simultaneous contact with the plate-surface, ensuring the effective initiation of the setting of the adhesive. Thus folded, the blank is shifted outwardly over the plate as it is advanced, until it is stopped by contact of the blank-body with a vertical wall 150 rising from the outer portion of the plate. This movement over the plate maintains the engagement between the faces, while bringing the blank into position for transfer to the pressure mechanism K. To locate the wall 150 most advantageously for blanks of different sizes, it is provided with an angular foot 152, which rests upon the plate and is secured thereto by bolts 154, passing through slots 156 in the foot and angularly related slots 158 in the plate (Fig. 23). This gives a capacity of the wall for both transverse and longitudinal adjustment, to properly guide the blank to the pressure mechanism. To increase the range of adjustment and avoid weakening the plate I by lengthening the slots 158, a second set of slots 160 may be formed in the plate to the rear and out of alinement with the companion slots.

With the end-wing forced against the corner-laps by its engagement with the top of the plate I, the blank is now advanced by the operator to the pressure mechanism K and above the wall J. This wall furnishes an inclined guide-surface 162 (Fig. 19), extending from the curved upper end 164 downwardly and inwardly to a foot 166, which lies below the pressure-table l to which it is attached by a slot-and-screw connection 168. The end 164 of the surface 162 is so spaced from the outer edge of the abutment k of the mechanism K, that, as the blank begins to descend along said surface, the end-wing-extension b is above a horizontal surface 170 upon the abutment. This so retains the extension, that, as the blank is lowered along the wall J, said extension is held back and bent up substantially at right angles to the end-wing e. Thus bent, the extension is held by a vertical end-surface 172 upon the abutment, until the end-wing reaches the upper face of the pressure-table. The blank is now forced rearwardly by the operator beneath the chamferred edge of the abutment, being kept in the proper transverse relation by guide-walls 174, 176 (Figs. 1 and 3) resting upon the table outside the abutment and adjustably secured in place by set-screws 178, threaded through ends of the walls extending beneath the table. The wall 174 is higher than its companion 176, and serves as a stop, the blank passing over the latter wall for contact with the former and being thus located for rearward movement. In this rearward travel, the end-wing-extension b of the blank is partially turned back over the end-wing e by its contact with the abutment k, as appears in Fig. 20. The folding is completed when the table l rises to apply setting pressure to the end-formation (Fig. 21). Just as the body of the blank is approaching its extreme rearward position, when the abutment lies within the partially formed box, the crease-portion or juncture between the end-wing and its extension contacts with the controlling mechanism N. Both walls 174 and 176 rise above the lower face of the abutment and thus provide guards, preventing the fingers of the operator from getting between the pressure-applying surfaces.

Instead of depending entirely upon the engagement of the end-wing-extension with the abutment-surface 170 for starting its turning in over the corner-laps, it may be subjected to a preliminary bending during its movement upon the folding plate I. This is illustrated in Fig. 23 of the drawings. Attached to the upper side of the plate, at its inner left portion, is a folding abutment 180. A portion of the upper face of this abutment, toward which the blank is moved by the operator over the plate, is curved at 181 upwardly and toward the rear of the apparatus to furnish a scroll. This scroll may be so situated according to the size of the blank to be folded, as by a slot-and-screw connection 182, that, when the blank is being advanced upon the plate along the wall 150, the edge of the end-wing-extension will strike the surface 181 to bend it upwardly and outwardly. It is thereby preflexed, to be more readily folded by its engagement with the abutment k.

The controlling mechanism N is illustrated in Figs. 14, 15 and 16. Furnishing a horizontal passage through the upper end of the column 14, from front to rear, is a tube 184, containing end bushings 186 in which a sleeve 188 is rotatable. From the forward extremity of the sleeve extends an arm 190, which, when the sleeve moves longitudinally, is arranged to engage and turn a double or yoke-like arm 192 pivoted upon the casing of the pilot-valve v. The arm 192 has an extension 194, which is held by a torsion-spring 196 to normally latch the plunger 198 of the valve v in a raised inactive position. When movement of the arm 190 longitudinally of the axis of the sleeve 188 shifts the lever-arm 194, it frees the valve-plunger to initiate the action of the hydraulic mechanism H, elevating the table l and applying setting pressure to the now completed end-formation of the blank. Upon the rear extremity of the sleeve, a collar 200 is secured, from which is a projection 202. A tension-spring 204 joins this projection to a fixed projection 206. The spring acts both to draw the sleeve forwardly and to rotate it about its axis. The interior of the sleeve is bushed at 208, and through the bushing a rod 210 is adjustable longitudinally while compelled to turn with the sleeve. At the forward end of the rod is an arm 212, the free end of which is held against the upper surface of the table l and at the rear of the abutment k by the spring 204, so it may move with said table as it rises to apply pressure to the work or is retracted. Here, it is in position to receive contact of the folded blank, as already explained, and by its bodily movement to control the valve v. The adjustment of the rod longitudinally of the sleeve allows the contact-arm to be positioned for engagement by blanks of different sizes. To effect this adjustment, the portion of the rod which is movable through the bushing 208 is flattened at 214, and threaded through the collar 200 and extending through the sleeve and bushing is a screw 216. The inner end of this screw lies close to the surface 214, so relative rotation between the sleeve and rod is prevented, yet longitudinal movement of the rod permitted. In the desired axial or longitudinal relation, the rod 210 is fixed by a set-screw 218, arranged in the elements through which it passes in the same manner as the screw 216, but clamping the rod and sleeve together. It has a finger-piece 220, by which it may be loosened or clamped about the rod. When the contact-arm 212 is to be adjusted, the screw 218 is backed off to free the rod 210, and the arm shifted to its new position, the screw 216 maintaining the rod and sleeve against relative rotation. Then, the screw 218 is tightened to secure the rod to the sleeve.

There may now be considered the pressure mechanism K and the actuation by the hydraulic mechanism H of the table l, referring to the general illustration of Figs. 1 and 3, the fluid-connections of Fig. 10, the valves of Figs. 11, 12 and 13, and the flow-diagram of Fig. 24. Rising from the rear of the cover 12 of the tank 10, and opening through said cover, is the tubular column 14, closed at its top and having a forwardly extending arm 230. To this arm the abutment k is separably secured by a screw 231. This permits the use of an abutment appropriate for the size of blank to be operated upon. The pressure-table l is carried upon a rod 232 projecting from a piston 234, movable within a cylinder 236 of the hydraulic motor h. The rod is guided by an arm 235 projecting forwardly from the column, and, with the piston, is held normally down by an expansion-spring 237. To the cylinder, fluid-pressure is applied by way of a pipe 238 (Fig. 24), the casing 240 of the main valve V, a pressure-regulating or relief-valve 242 contained in said casing and a pipe 243, from an accumulator-chamber within the column 14. Oil, or other liquid, is forced into the chamber through a pipe 244 by a pump 245, drawing it from the tank 10 by way of a pipe 246.

Movable in the casing of the main valve is a plunger 247, having an enlargement 248 of maximum diameter and at its lower extremity an enlargement 250 of less diameter. From the enlargement 248 a stem 252 extends upwardly. For convenience in manufacture, this stem may be separate from the remainder of the plunger. The parts 248, 250 and 252 all fit within passages in the casing, and the effective area of the enlargement 248 is less than the like combined areas of the enlargement 250 and the stem 252. The flow from the accumulator enters between the enlargements 248 and 250, and is free to pass through a passage 254 in the casing 240, through a needle-valve 256 and by way of a pipe 258 to the casing 260 of the pilot-valve v. In this casing is movable the plunger 198, already referred to as controlled by the mechanism N, it fitting within a vertical passage and being provided with an upwardly extending stem 264, normally cutting off the flow from the pipe 258 to a passage 266 past the stem. Below this passage and above the plunger 198, a pipe 268 joins the casing 260 to the tank 10. The plunger of the pilot-valve is held initially in a raised position by the latch-arm 194 (Fig. 14), which furnishes a rest for said plunger. When the operator, advancing a blank into co-operation with the abutment k, forces the arm 190 against the latch arm 192, he removes the extension 194 from beneath the plunger, so this is free to fall. The latch-arm is immediately returned to its position against the plunger by the spring 196, ready to support it at the termination of the pressure-opertaion. The plunger 198 is reset for latching by a projection 270 from the pressure-table l, this projection rising upon the application of pressure to the work into contact with the lower extremity of the plunger.

Pressure, set up by the pump 245 in the accumulator-chamber in the column 14, is applied to a degree determined by the force of the spring 272 of the relief-valve 242 (Fig. 12), variable by a screw 274 threaded in the casing of the main valve V. Entering the passage 254 of the valve V, it passes through the needle-valve 256 and the pipe 258, to be effective upon the upper extremity of the stem 264 of the pilot-valve-plunger 198. When this plunger is unlatched by the box-blank through the controlling mechanism N, the pressure lowers it so the upper extremity of the stem frees the passage 266, and oil may flow through the pipe 268 to the tank. Up to the time of this opening of the pilot-valve, the force exerted downwardly upon the enlargement 250 of the main valve plunger 247 and the stem 252 has exceeded that exerted upwardly upon the underside of the enlargement 248, so the accumulator-pressure is kept from the pipe 238 by the enlargement 248. Upon the discharge of oil through the passage 266, the pressure upon the end of the stem 252 is decreased, and now the lifting force upon the underside of the enlargement 248 is sufficient to overcome the downward force, so the plunger 247 is raised and accumulator-pressure becomes effective through the pipe 238 upon the piston 234. This elevates the pressure-table l against the folded blank B applied to the abutment k to set the glued end-formation. As the enlargement 248 opens the pipe 238 to receive operating pressure, it closes a passage 276 from the casing of the valve V, through which the cylinder 236 exhausted during the previous operation.

When, as previously indicated, the pressure-table l reaches its operating position, the projection 270 lifts the plunger of the pilot-valve, and this is relatched by the arm 194. The path for escape of pressure to the passage 266 is now closed, and it may again build up above the stem 264 through the passage 254 in the main valve V at a rate determined by the setting of the needle-valve 256. When this downward pressure, effective upon the upper extremity of the stem, together with that upon the enlargement 250, exceeds the upward pressure upon the enlargement 248, the plunger 247 of the main valve is restored to its original position, cutting off pressure from the cylinder 236. The piston 234 with the pressure-table is retracted by the spring 237, the oil exhausting at 276. The elements are now in their normal relation, and the box, with its end-formation completed, may be removed.

From the interior of the main valve V, between the plunger-enlargements 248 and 250, runs a pipe 278 to the inlet-side of the pump 245. In this pipe is a four-way valve 280. As the apparatus is used, air in the form of tiny bubbles is taken up by the oil, until it will reach a stage in which there may be an insufficient body within the chamber in the column 14 to furnish a proper cushion. Or air may be lost by leakage. To correct these conditions, the valve is turned to the position appearing in Figs. 10 and 24. It will be seen that a way is now furnished for exhaust of the oil at 282 from the accumulator-chamber by way of the pipe 243 and the valve V, while at 284 is an intake for air to pass through the pipe 278 and the pump to the accumulator-chamber. This is the recharging position, in which oil is allowed to flow out of the chamber and air to enter. When the accumulator has been refilled with air, the valve 280 is closed, and the pump restores the body of oil to the accumulator below the air-cushion.

To render the manually controlled elements of the hydraulic mechanism H accessible to the operator, and as appears in Figs. 1 and 10, the stem of the needle-valve 256 extends through an opening in the cover 12 of the tank, and has upon its finger-piece 290 a hand or pointer 292, which may be referred to index-marks upon the cover to determine the setting of the valve. The finger-piece 294 of the relief-valve 242 is similarly situated above the cover, as is also a hand-lever 296 upon the spindle of the air-recharging valve 280.

In the use of the improved apparatus to perform the method of my invention, either a box-blank B, as generally shown in the drawings, or a cover-blank C, particularly illustrated in Fig. 22, may be set up. The table F, the folding plate I, the walls 150, J, 174, 176 and the controlling mechanism N, will be adjusted and an abutment k applied, to correspond to the character and size of the blank to be operated upon. The operator taking the top blank from the support M folds up the side-wings c substantially at right angles to the body d, and, with said blank lying in a substantially vertical plane, presses the ends of the lower corner-laps e against the terminal portion f of the guide-table F, at the same time shifting it to the left along the table. When thus held, even the largest blank will be well spaced from the body of the operator and will produce no interference, while if positioned with its length along a horizontal plane it might be awkward to manipulate. The end-wing e and its extension b are in vertical alinement with the blank-body, and, protected by the shield 134 from the distributing roll 96 of the gluing mechanism G, passes the vertical periphery of the driven applying roll 72. Held against this by the pressure-roll 118, the inner faces of the end-wing and its extension receive a coating of the adhesive which is raised from the pot 52 by the meshing helical depressions 114 and projections 116 of the rolls 72 and 96. The action of the applying roll aids in the forward travel of the work. With the blank guided as described, all sizes may be coated without the necessity for adjusting the table vertically. Still advanced in a vertical position by the operator along the guide-table F, the forward edge of the end-wing encounters the edge 142 of the plate I and in passing from the table to the plate is folded up, the outer face of the end-wing resting upon the top of the plate, while the inner coated face is forced against the corner-laps and there held as the blank is shifted outwardly toward the operator upon the plate until stopped by the wall 150. With the advance to the left continuing over the plate, the folding of the end-wing-extension may, if desired, be started by the abutment-surface 181, the blank now arriving above the wall J upon the table l of the pressure-mechanism K, and being stopped by the wall 174. Without change in the vertical relation of the blank, and, therefore, without the delay which would be occasioned by repositioning, it is lowered along the wall J. In this movement the end-wing-extension strikes the horizontal surface 170 of the fixed abutment k and is bent thereby substantially at right angles to the end-wing, and thus retained as the outer face of the end-wing reaches the pressure-table. The end of the extension is at this time just above the bottom of the abutment, and as the operator carries the blank inwardly back between the walls 174 and 176, the extension is turned over the corner-laps adhering to the end-wing. Upon the arrival of the blank-body against the outer end of the abutment, the juncture of the end-wing and its extension actuates the controlling mechanism N, causing its arm-extension 194 to free the plunger 198 of the pilot-valve v included in the hydraulic mechanism H. Excess of pressure upon the enlargement 250 of the plunger 247 plus that upon the stem 252, over what is exerted upon the enlargement 248, has been holding the main valve V closed, cutting off the connection between the cylinder 236 of the mechanism K and the accumulator-chamber in the column 14 supplied by the pump 245. The table l is consequently depressed by its spring 237 for the reception of the end-formation of the blank beneath the abutment k. When the release of the plunger of the pilot-valve frees the passage 266 therein, escape of pressure through the needle-valve 256 transfers the balance of the force upon the plunger 247 to the enlargement 248, and the main valve V opens. Accumulator-pressure is now applied through said main valve to the piston 234 in the cylinder 236, elevating the table $l$ to urge the elements of the coated end-formation against the abutment. The folding of the end-wing-extension is thereby completed, and pressure is applied to the entire end-formation. As the table is raised, its projection 270 lifts the plunger of the pilot-valve to close the passage 266 and said plunger is relatched by the arm-extension 194 of the controlling mechanism N. The force exerted upon the work will be determined by the setting of the relief-valve 242, and the length of time it is applied by the rate at which the needle-valve 256 permits pressure to be reestablished above the stem 252 of the main valve, because of the closure of the pilot-valve. At the termination of this period, the adhesive will have sufficiently set, and the excess of pressure opposing that upon the enlargement 248 will have closed the valve V, cutting off the connection between the accumulator-chamber and the cylinder 236, whereupon the spring 237 will again lower the table $l$. The set-up end of the blank is then removed from the pressure mechanism. The partially folded blank may now be inverted, and the other end operated upon in the same manner. If after continued use the air-cushion in the accumulator-chamber is taken up by the oil or otherwise lost, it may be renewed by arranging the valve 280 as appears in Fig. 24. Normally this valve is closed.

Having thus described my invention, what I claim as new and desire to secure by Letters Patent of the United States is:

1. In box-making apparatus, a guide having a substantially horizontal surface along which a box-blank may be advanced held in the hands of the operator with a portion depending below the guide, a folding member spaced outwardly from the guide toward the operator and having an edge inclined rearwardly of the apparatus and in the direction of advance of the blank for engagement with the depending portion of the blank advancing from the guide, and pressure mechanism situated beyond the guide and inwardly from the folding member and operator and having means for folding a part of the depending portion during inward movement of the blank.

2. In box-making apparatus, a guide having a substantially horizontal surface along which a box-blank may be advanced held in the hands of the operator with a portion depending below the guide, and a folding member spaced outwardly from the guide toward the operator and having an edge inclined rearwardly of the apparatus and in the direction of advance of the blank for engagement with the depending portion of the blank advancing from the guide, the entire upper face of said member presenting a substantially horizontal surface upon which the outer face of the depending portion may rest after its folding by the inclined edge and be free for movement both outwardly toward the operator and in the direction of advance.

3. In an apparatus for making boxes of the end-wing and corner-lap type, a table having a substantially horizontal surface arranged to receive contact of the folded corner-laps of a blank as it is advanced, held in the hands of the operator, the bottom-wall of said blank being toward the body of the operator and its length vertically disposed, the end-wing of the blank projecting below the table, adhesive-applying mechanism situated below the table and arranged to coat the inner face of the end-wing, and a substantially horizontal plate having an inclined edge arranged to fold up the end-wing of the blank advancing from the table, the outer face of said end-wing resting upon the upper surface of the plate after its folding by the inclined edge with the coated inner face pressed against the corner-laps, the plate-surface presenting an area sufficient to receive simultaneous contact of the greater portion of the end-wing and to initiate thereover the setting of the applied adhesive.

4. In a box-making apparatus, a guide having a substantially horizontal surface along which a blank partially folded by the operator may be advanced manually, means for operating upon the blank during said advance, opposite pressure members relatively movable in a direction confined to the vertical and between which a folded portion of the blank may be introduced, and means for causing such relative vertical movement immediately upon introduction of the blank.

5. In a box-making apparatus, a guide having a substantially horizontal surface along which a blank partially folded by the operator may be advanced manually, means for operating upon the blank during said advance, opposite pressure members relatively movable in a direction confined to the vertical and between which a folded portion of the blank may be introduced, means for causing such relative vertical movement immediately upon introduction of the blank, and fluid-pressure mechanism having a vertically positioned cylinder and piston for producing the relative movement.

6. In a box-making apparatus, a guide having a substantially horizontal surface along which a blank partially folded by the operator may be advanced manually, means for operating upon the blank during said advance, opposite pressure members relatively movable in a substantially vertical direction and between which a folded portion of the blank may be introduced, fluid-pressure mechanism for producing the relative movement, a valve by which the fluid-pressure mechanism is controlled, and a movable member for holding the valve in position to prevent the application of pressure, the blank in its travel between the pressure members moving the holding member to free the valve.

7. In an apparatus for making boxes of the end-wing and corner-lap type, a table having a substantially horizontal surface arranged to receive contact of the folded corner-laps of a blank as it is advanced manually, the end-wing of the blank projecting below the table, adhesive-applying mechanism situated below the table, means for folding up the end-wing against the corner-laps during said advance and contacting simultaneously with the greater portion of the area of the end-wing to initiate the setting of the applied adhesive, and opposite pressure members relatively movable in a substantially vertical direction and between which the folded corner-laps and the end-wing may be introduced.

8. In box-making apparatus, a guide along which a blank may be advanced by the operator, adhesive-applying and folding means for operating upon the end-formation of the blank during its advance, and opposite relatively movable pressure members between which the end-formation is introduced, said pressure members having a plurality of surfaces by successive contact with which a portion of the blank is folded during its manual advance.

9. In an apparatus for making boxes of the end-wing and corner-lap type, a table having a substantially horizontal surface arranged to receive contact of the folded corner-laps of a blank as it is advanced manually, the end-wing of the blank projecting below the table, adhesive-applying mechanism situated below the table, means situated outwardly from the table for folding up the end-wing against the corner-laps during said advance, and opposite pressure members relatively movable in a substantially vertical direction and between which the folded corner-laps and the end-wing may be introduced, said pressure members having surfaces by contact with which an extension of the end-wing is folded during its manual movement inwardly after the folding of the end-wing.

10. In box-making apparatus, a guide having a substantially horizontal surface along which a box-blank may be advanced by the operator with a portion depending below the guide, a folding plate situated in a plane parallel to the guide-surface and having its inner edge inclined rearwardly of the apparatus and in the direction of advance of the blank for engagement with the depending portion of the blank advancing from the guide, and opposite pressure members relatively movable in a substantially vertical direction and between which the folded portion of the blank may be introduced.

11. In box-making apparatus, a table having a substantially horizontal surface over which blanks may be advanced manually by the operator with a portion depending below the table, and a folding plate for engagement by said depending portion, said plate being situated at the forward end of the table and having a substantially horizontal upper surface over which the blanks may be shifted toward the operator and having an edge extending along the surface and inclined from a point in front of said table at the operator's side rearwardly and in the direction of advance of the blanks.

12. In box-making apparatus, a table having a substantially horizontal surface over which blanks may be advanced manually by the operator with a portion depending below the table, a folding plate for engagement by said depending portion, said plate being situated at the forward end of the table and having a substantially horizontal upper surface over which the blanks may be shifted toward the operator and having an edge extending along the surface and inclined from a point in front of said table at the operator's side rearwardly and in the direction of advance of the blanks, and means for limiting the outward movement of the blank toward the operator upon the upper surface of the plate.

13. In box-making apparatus, a table having a substantially horizontal surface over which blanks may be advanced manually by the operator with a portion depending below the table, a folding plate for engagement by said depending portion, said plate being situated at the forward end of the table and having a substantially horizontal upper surface over which the blanks may be shifted toward the operator and having an edge extending along the surface and inclined from a point in front of said table at the operator's side rearwardly and in the direction of advance of the blanks, and a wall extending along the upper surface of the plate at the outer edge toward the operator.

14. In box-making apparatus, a table having a substantially horizontal surface over which blanks may be advanced manually with a portion depending below the table, a folding plate for engagement by said depending portion, said plate being situated at the forward end of the table and having a substantially horizontal upper surface and an edge inclined from a point in front of said table rearwardly and in the direction of advance of the blanks, a wall extending along the outer edge of and resting upon the upper surface of the plate, and means arranged to secure the wall to the plate in different positions.

15. In box-making apparatus, a table having a substantially horizontal surface over which blanks may be advanced manually with a portion depending below the table, a folding plate for engagement by said depending portion, and means arranged to vary the position of the folding plate longitudinally of the table.

16. In box-making apparatus, a table having a substantially horizontal surface over which blanks may be advanced manually with a portion depending below the table, a folding plate for engagement by said depending portion, means arranged to vary the position of the folding plate longitudinally of the table, and means arranged to vary the height of the plate.

17. In blank-making apparatus, a frame, a table carried by the frame and along which blanks may be advanced manually, a bracket supported upon the frame, means for fixing the bracket in different positions longitudinally of the table, and a plate mounted on the bracket and arranged to engage and fold a portion of the blank.

18. In blank-making apparatus, a frame, a table carried by the frame and along which blanks may be advanced manually, a bracket supported upon the frame, means for fixing the bracket in different positions longitudinally of the table, a rod rising from the bracket, means arranged to fix the rod in different vertical positions upon the bracket, and a plate secured to the rod and arranged to engage and fold a portion of the blank.

19. In box-making apparatus, opposite relatively movable pressure members, and a guide carried by one of the pressure members for directing the end-formation of a box-blank toward the space between the said pressure members.

20. In box-making apparatus, opposite relatively movable pressure members, and a guide carried by one of the pressure members for directing a portion of the end-formation of a box-blank against one of the pressure members and then toward the space between said members.

21. In an apparatus for making boxes of the end-wing, end-wing-extension and corner-lap type, opposite relatively movable pressure members to which a blank may be presented manually with its corner-laps and end-wing folded, and a blank-guiding means associated with the pressure members and engaged by the end-wing-extension as the blank is advanced to fold the end-wing-extension.

22. In box-making apparatus, opposite relatively movable pressure members, one of which is provided with a surface against which a blank held in the hands of the operator is carried to fold a position, and a guide carried by one of the members and inclined toward the other member in the direction of pressure movement, said guide being arranged to receive contact of a blank advanced by the operator and direct it against the folding surface of the pressure member.

23. In box-making apparatus, opposite relatively movable pressure members, one of which is provided with a surface against which a blank held in the hands of the operator is carried to fold a portion, a guide carried by one of the members and inclined toward the other member in the direction of pressure movement, said guide being arranged to receive contact of a blank advanced by the operator and direct it against the folding surface of the pressure member, and means arranged to fix the guide in different positions upon the member by which it is carried.

24. In box-making apparatus, a guide along which a blank may be advanced manually, means for operating upon an end-formation of the blank while thus guided to effect its closure, lower and upper relatively movable pressure members between which the closed end is advanced, and a guide for continuing the direction of the blank toward the pressure members and extending outwardly and upwardly from the lower pressure member.

25. In box-making apparatus, a guide along which a blank may be advanced manually, means for operating upon an end-formation of the blank while thus guided to effect its closure, lower and upper relatively movable pressure members between which the closed end is advanced, a guide for continuing the direction of the blank toward the pressure members and extending outwardly and upwardly from the lower pressure member, and means arranged to fix the guide in different positions toward and from the upper pressure member.

26. In an apparatus for making boxes, opposite relatively movable pressure members, one of which is provided with angularly related surfaces, and a guide carried by the other pressure member and arranged to direct a portion of a blank as it is advanced in the hands of the operator against one of the surfaces and then along the other surface to fold said portion.

27. In an apparatus for making boxes of the end-wing, end-wing-extension and corner-lap type, opposite relatively movable pressure members to which a blank may be presented manually with its corner-laps and end-wing folded, one of said pressure members being provided with angularly related surfaces, and a guide carried by the other pressure member and arranged for engagement with one extremity of the folded end-wing and to direct the end-wing-extension against one of the surfaces and then along the other.

28. In an apparatus for making boxes, opposite relatively movable pressure members, one of which is provided with angularly related surfaces, and a guide carried by the other pressure member and arranged to direct a portion of a blank as it is advanced in the hands of the operator against one of the surfaces and then along the other surface to fold said portion and finally toward the space between the members for the completion of the folding.

29. In box-making apparatus, opposite relatively movable pressure members into co-operation with which a box is advanced, one of said members being adapted to lie within a box, and spaced walls carried by the other pressure member at opposite sides of its pressure surface and arranged to guide the box into position to receive pressure, one of said walls lying in the path of advance of the box to serve as a stop.

30. In box-making apparatus, opposite relatively movable pressure members into co-operation with which a box is advanced, one of said members being adapted to lie within a box, and spaced walls carried by the other pressure member at opposite sides of its pressure-surface and arranged to guide the box into position to receive pressure, both of said walls being of sufficient height to guard against the entrance of the fingers of the operator between the pressure members as he advances the box, and one of said walls lying in the path of advance of the box to serve as a stop.

31. In box-making apparatus, a guide along which a blank may be advanced manually, opposite relatively movable pressure members situated beyond the guide, and spaced guide-walls for a box carried by one of the pressure members outside the other and at different distances from the guide, the wall farthest from the guide being higher than the other and serving as a stop for the blank.

32. In box-making apparatus, a guide along which blanks may be advanced manually, and a member for folding one portion of a blank into contact with another and situated at the forward end of the guide, said member carrying means effective after the first blank portion has been folded for folding another portion of the blank which projects from the first portion.

33. In box-making apparatus, a guide along which blanks may be advanced manually, a plate having an edge for folding one portion of the blank and a surface against which the partially folded blank is pressed by the operator, and a projection from the surface for folding another portion of the blank as it is advanced by the operator over said surface.

34. In box-making apparatus, a guide along which blanks may be advanced manually, a plate having an edge for folding one portion of the blank and a surface against which the partially folded blank may rest, a projection from said surface for folding another portion of the blank, and means arranged to fix the projection in different positions upon the surface.

35. In apparatus for making boxes of the end-wing and end-wing-extension type, a guide along which blanks may be advanced manually, a plate for folding the end-wing situated at the forward end of the guide, and an upwardly and rearward curved projection from the plate for folding the end-wing-extension.

36. In box-making apparatus, a guide along which blanks may be advanced manually, a member for folding one portion of a blank and situated at the forward end of the guide, said member carrying means for folding another portion of the blank, and means acting upon further advance of the blank for completing the folding of such other portion.

37. In apparatus for making boxes of the end-wing and end-wing-extension type, a guide along which blanks may be advanced manually, a plate for folding the end-wing situated at the forward end of the guide, an upwardly and rearwardly curved projection from the plate for folding the end-wing-extension, and pressure mechanism by which the folding of the end-wing-extension is completed.

38. In an apparatus for making boxes of the end-wing, end-wing-extension and corner-lap type, opposite relatively movable pressure members to which a blank may be presented manually in position to receive pressure after its corner-laps and end-wing and its extension have been folded, fluid-pressure actuating mechanism for producing the relative movement of the pressure members, and means acted upon by the juncture of the end-wing and its extension after the fold between these has been formed for controlling the fluid-pressure mechanism.

39. Work-pressing means comprising opposite relatively movable pressure members normally positioned for the introduction of the work between them held in the hands of the operator, fluid-pressure actuating mechanism for producing the relative movement, and means movable by work as it is introduced between the pressure members for controlling the fluid-pressure upon the actuating mechanism.

40. Work-pressing means comprising opposite relatively movable pressure members normally positioned for the introduction of the work between them, fluid-pressure actuating mechanism for producing the relative movement, a valve by which the fluid-pressure is controlled, and means movable by work during its introduction between the pressure members for causing the operation of the valve.

41. In box-making apparatus, an abutment, a movable pressure member co-operating therewith, actuating mechanism for moving the pressure member, a stationary mounting, and a member movable upon the mounting with the pressure member and by the work for controlling the actuating mechanism.

42. In box-making apparatus, an abutment, a movable pressure member co-operating therewith, actuating mechanism for moving the pressure member, a contact member movable by the work, a member movable to control the actuating mechanism, and means arranged to secure the contact member and controlling member together with said contact member in different normal positions.

43. In box-making apparatus, an abutment, a movable pressure member co-operating therewith, actuating mechanism for moving the pressure member, and a member rotatable by the pressure member and movable bodily by the work for controlling the actuating mechanism.

44. In box-making apparatus, an abutment, a movable pressure member co-operating therewith, actuating mechanism for moving the pressure member, a member rotatable by the pressure member and movable bodily by the work for controlling the actuating mechanism, and a spring acting to resist both the rotation and bodily movement.

45. In box-making apparatus, a frame, an abutment carried thereby, a pressure-table movable upon the frame and co-operating with the abutment, actuating mechanism for the table, a sleeve movable in the frame and controlling the actuating mechanism, and a rod extending through the sleeve and fixed thereto, said rod having a portion situated above the pressure-table to receive contact of the work.

46. In box-making apparatus, a frame, an abutment carried thereby, a pressure-table movable upon the frame and co-operating with the abutment, actuating mechanism for the table, a sleeve rotatable in and longitudinally movable through the frame and controlling the actuating mechanism, and a rod extending through the sleeve and fixed thereto, said rod having a portion situated above the pressure-table for movement by said table and to receive contact of the work.

47. In box-making apparatus, a frame, an abutment carried thereby, a pressure-table movable upon the frame and co-operating with the abutment, actuating mechanism for the table, a sleeve rotatable in and longitudinally movable through the frame and controlling the actuating mechanism, a rod extending through the sleeve and fixed thereto, said rod having a portion situated above the pressure-table for movement by said table and to receive contact of the work, and a tension-spring resisting movement of the sleeve.

48. In box-making apparatus, a frame, an abutment carried thereby, a pressure-table movable upon the frame and co-operating with the abutment, actuating mechanism for the table, a sleeve movable in the frame and controlling the actuating mechanism, a rod extending through the sleeve and fixed thereto, said rod having a portion situated above the pressure-table to receive contact of the work, and means arranged to secure the rod in different positions longitudinally of the sleeve.

49. Work-pressing mechanism comprising opposite relative movable pressure members, fluid-pressure actuating mechanism for producing the relative movement, a pilot-valve, a latch holding said pilot-valve normally closed, means operated by work applied to the pressure members for releasing the latch, and a main valve controlled by the pilot-valve and governing the actuating mechanism.

50. Work-pressing mechanism comprising opposite relatively movable pressure members, fluid-pressure actuating mechanism for producing the relative movement, a pilot-valve, a latch holding said pilot-valve normally closed, a main valve controlled by the pilot-valve and governing the actuating mechanism, means operated by work applied to the pressure members for releasing the latch, and means operated in the relative movement of the members for causing the closing and relatching of the pilot-valve.

51. Work-pressing mechanism comprising an abutment, a pressure member movable toward and from the abutment, a fluid-pressure motor connected to the pressure member, means for creating fluid-pressure, a main valve controlling the delivery of fluid-pressure to the motor and held normally closed by said pressure, a pilot-valve so receiving fluid-pressure that it tends to open, a latch holding the pilot-valve normally closed, and means governed by work applied to the abutment for unlatching the pilot-valve to allow it to open and change the pressure upon the main valve to cause it to open.

52. Work-pressing mechanism comprising an abutment, a pressure member movable toward and from the abutment, a fluid-pressure motor connected to the pressure member, means for creating fluid-pressure, a main valve controlling the delivery of fluid-pressure to the motor and held normally closed by said pressure, a pilot-valve so receiving fluid-pressure that it tends to open, a latch holding the pilot-valve normally closed, means governed by work applied to the abutment for unlatching the pilot-valve to allow it to open and change the pressure upon the main valve to cause it to open, and means movable by the pressure member for closing the pilot-valve and permitting it to be again latched.

53. In box-making apparatus, means for preparing the end-formation of a blank, blank-pressing mechanism for completing the end-formation, fluid-pressure actuating mechanism for the pressing mechanism, and means for holding the fluid-pressure upon the pressing mechanism for a time predetermined in the operation of the apparatus.

54. In box-making apparatus, means for preparing the end-formation of a blank, blank-pressing mechanism for completing the end-formation, fluid-pressure actuating mechanism for the pressing mechanism, means acted upon by the blank for initiating the application of fluid-pressure to the pressing mechanism, and means controlled by the fluid for holding the fluid-pressure upon the pressing mechanism for a definite time.

55. Work-pressing means comprising opposite relatively movable pressure members, fluid-pressure actuating mechanism for producing the relative movement, a main valve governing the actuating mechanism and operated by fluid-pressure, a pilot-valve controlling the degree of pressure upon the main valve to open and close it, and means for varying the rate of change of pressure.

56. Work-pressing means comprising opposite relatively movable pressure members, fluid-pressure actuating mechanism for producing the relative movement, a normally closed main valve governing the actuating mechanism and operated by fluid-pressure, a normally closed pilot-valve opened by fluid-pressure and thereby altering pressure upon the main valve to open it, and means for closing the pilot valve to again alter the pressure upon the main valve to close it.

57. Work-pressing means comprising opposite relatively movable pressure members, fluid-pressure actuating mechanism for producing the relative movement, a normally closed main valve governing the actuating mechanism and operated by fluid-pressure, a normally closed pilot-valve opened by fluid-pressure under the control of the work and thereby altering pressure upon the main valve to open it, and means operating in the relative movement of the pressure members for closing the pilot-valve to again alter the pressure upon the main valve to close it.

58. Work-pressing means comprising opposite relatively movable pressure members, fluid-pressure actuating mechanism for producing the relative movement, a normally closed main valve governing the actuating mechanism and operated by fluid-pressure, a normally closed pilot-valve opened by fluid-pressure and thereby altering pressure upon the main valve to open it, means for closing the pilot-valve to again alter the pressure upon the main valve to close it, and means arranged to vary the rate of change of pressure closing the main valve.

59. Work-pressing means comprising opposite relatively movable pressure members, fluid-pressure actuating mechanism for producing the relative movement, a normally closed main valve governing the actuating mechanism and operated by fluid-pressure, a pilot-valve connected to the main valve to control the degree of pressure upon said main valve to open and close it, and a valve in the connection between the pilot-valve and the main valve.

60. Work-pressing means comprising opposite relatively movable pressure members, fluid-pressure actuating mechanism for producing the relative movement, a valve having a plunger governing the application of fluid-pressure to the actuating mechanism, means for applying fluid-pressure oppositely to the plunger, an excess of pressure in one direction holding the valve normally closed, means for reducing the excess pressure to cause the valve to open and again increasing the pressure to cause the valve to close, and means arranged to vary the increase of pressure.

61. Work-pressing means comprising opposite relatively movable pressure members, fluid-pressure actuating mechanism for producing the relative movement, a main valve having a plunger governing the application of fluid-pressure to the actuating mechanism, means for applying fluid-pressure oppositely to the plunger, a pilot-valve which when closed causes an excess of pressure in one direction upon the plunger of the main valve holding it closed, means for opening the pilot-valve to reduce the excess of pressure to cause the main valve to open, means for closing the pilot-valve to increase excess of pressure and cause the main valve to close, and a needle-valve for controlling the rate of increase of pressure.

62. Work-pressing mechanism comprising an abutment, a pressure member movable toward and from the abutment, a fluid-pressure motor connected to the pressure member, means for creating fluid-pressure, a main valve controlling the delivery of fluid-pressure to the motor and held normally closed by said pressure, a pilot-valve governed by work applied to the abutment to alter the pressure upon the main valve and cause it to open and governed by the movement of the pressure member to alter the pressure upon the main valve and cause it to close, and means arranged to vary the rate at which the closing pressure is altered.

63. Work-pressing mechanism comprising relatively movable pressure members, an hydraulic motor for producing relative movement, a pump for creating hydraulic pressure, an accumulator-chamber, piping joining the pump, accumulator and motor and through which said pump forces liquid, and a valve connected to said piping and to the inlet-side of the pump, said valve being normally closed but which when open permits the discharge of liquid from the accumulator and the introduction of air.

64. The method of making boxes, in which an operator partially folds a blank which is elongated in one direction, holds said blank with its major dimension substantially vertical, and thus positioned shifts it transversely along a guide to receive the action of adhesive-applying means and then outwardly from said guide to receive the action of folding means.

65. The method of making boxes, in which an operator partially folds a blank which is elongated in one direction, holds said blank with its major dimension substantially vertical, and thus positioned shifts it transversely along a guide to receive the action of adhesive-applying means and then outwardly from said guide to receive the action of folding means, and with the blank still in its substantially vertical relation shifts it inwardly to receive the action of pressure-applying means.

66. The method of making boxes, in which an operator partially folds a blank, shifts the blank along a guide to receive the action of adhesive-applying means and folding means, and moves the blank into pressure-applying means in different directions to further fold it by contact therewith during its advance and to receive pressure.

67. The method of making boxes from blanks of the type having side-wings, corner-laps, end-wings, and end-wing-extensions, which consists in folding the side-wings of a blank manually, folding the corner-laps by engagement with a substantially horizontal guide, shifting the blank along the guide with its body substantially vertical and its end-wing depending from said guide to subject said end-wing to the action of adhesive-applying means, shifting the blank outwardly into contact with folding means to turn the end-wing against the corner-laps, and shifting the blank inwardly into contact with pressure-applying means to fold the end-wing-extension and to position the folded end-formation for the reception of setting pressure.

68. The method of making boxes from blanks of the type having side-wings, corner-laps, end-wings and end-wing-extensions, which consists in folding the side-wings of the blank manually, folding the corner-laps by engagement with a guide, shifting the blank along the guide to subject the end-wing and its extension to the action of adhesive-applying means and folding means for the end-wing, and moving the blank into pressure means to fold the end-wing-extension during the movement of the blank to an angle with the end-wing of less than 90° and to receive the application of setting pressure.

CUTLER D. KNOWLTON.